(12) United States Patent
Binder

(10) Patent No.: US 8,527,528 B2
(45) Date of Patent: Sep. 3, 2013

(54) EVALUATING REAL ESTATE PROPERTIES

(76) Inventor: Neil Binder, New York, NY (US)

( * ) Notice: Subject to any disclaimer, the term of this patent is extended or adjusted under 35 U.S.C. 154(b) by 1624 days.

(21) Appl. No.: 11/726,859

(22) Filed: Mar. 23, 2007

(65) Prior Publication Data

US 2008/0235212 A1 Sep. 25, 2008

(51) Int. Cl.
*G06F 17/30* (2006.01)
(52) U.S. Cl.
CPC .................. *G06F 17/30495* (2013.01)
USPC ............ 707/758; 707/723; 707/749
(58) Field of Classification Search
CPC ................................. G06F 17/30495
USPC ............. 707/770, 771, 723, 748, 749, 758
See application file for complete search history.

(56) References Cited

U.S. PATENT DOCUMENTS

| | | | |
|---|---|---|---|
| 5,754,850 A * | 5/1998 | Janssen | 707/758 |
| 5,754,939 A * | 5/1998 | Herz et al. | 455/3.04 |
| 8,156,128 B2 * | 4/2012 | Ramer et al. | 707/748 |
| 2002/0138481 A1 * | 9/2002 | Aggarwal et al. | 707/758 |
| 2007/0043529 A1 * | 2/2007 | Johnson | 702/150 |
| 2007/0198466 A1 * | 8/2007 | Sullivan et al. | 707/669 |
| 2008/0091408 A1 * | 4/2008 | Roulland et al. | 704/9 |
| 2008/0095441 A1 * | 4/2008 | Rosskamm et al. | 382/183 |
| 2009/0192862 A1 * | 7/2009 | Hoggard | 705/9 |
| 2010/0229096 A1 * | 9/2010 | Maiocco et al. | 715/734 |

* cited by examiner

*Primary Examiner* — Shahid Alam
(74) *Attorney, Agent, or Firm* — Hoffmann & Baron LLP

(57) ABSTRACT

The present invention is an improved system and method for analyzing multiple real estate properties. The system includes a pool of properties that are searched based on user-defined search criteria. The system identifies comparison properties from the search pool. The comparison properties include attributes that match or are a near match to the search criteria. The system compares each of the comparison properties to at least one average value and demonstrably depicts the comparison to the user.

34 Claims, 4 Drawing Sheets

| | 96 | 98 | 100 | 102 | 104 | 108 | 110 | 112 | 116 | 118 |
|---|---|---|---|---|---|---|---|---|---|---|
| | | | | ⟵Light⟶ | | ⟵——Space——⟶ | | | | Monthly |
| Address | Location Grade | Building Grade | Floor | View Grade | Living Room | Master BR | = | Total* | Price | Cost |
| Apt. 1 | 6 | 8 | 8 | 6 | 30 x 12 | 16 x 11 | | 536 | $490K | $2,200 |
| Apt. 2 | 8 | 8 | 8 | 4 | 32 x 12 | 17 x 11 | | 571 | 550K | 2,700 |
| Apt. 3 | 7 | 6 | 12 | 8 | 32 x 12 | 18 x 12 | | 600 | 595K | 2,500 |
| Apt. 4 | 5 | 5 | 16 | 4 | 36 x 12 | 18 x 14 | | 684 | 650K | 2,000 |
| Apt. 5 | 9 | 9 | 24 | 9 | 34 x 12 | 17 x 11 | | 595 | 700K | 2,800 |
| Total | 35 | 36 | 68 | 31 | | | | 2,986 | 2,985 | 12,200 |
| Average (rounded) | 7 | 7 | 14 | 6 | | | | 598 | 597K | 2,440 |

*Total is only for the value rooms.

FIG. 5

| | Address | Price | Location Grade | Building Grade | Floor | View Grade | Space | Price | Monthly Cost |
|---|---|---|---|---|---|---|---|---|---|
| | Apt 1 | $490,000 | - | + | - | = | - | + | + |
| | Apt 2 | $550,000 | + | + | - | - | - | + | - |
| | Apt 3 | $595,000 | = | - | - | + | = | = | = |
| | Apt 4 | $650,000 | - | - | + | - | + | - | + |
| | Apt 5 | $700,000 | + | + | + | (+) | (=) | (-) | - |

FIG. 6

EVALUATING REAL ESTATE PROPERTIES

BACKGROUND OF THE INVENTION

The present invention generally relates to real estate evaluations, and more particularly to identifying an optimal real estate property among alternatives.

Generally, real estate properties are offered for sale by sellers through real estate brokers. Typically, the real estate broker prepares information about the property using a form developed by the brokerage company or by a local multiple listing service that describes the property in a prescribed way. This description is generally referred to as a listing. Listings are customarily stored in a search pool of a computerized system that maintains information regarding properties for sale. Several of these computer systems include techniques by which listing information is retrieved from the search pool by price, type, property address or zip code. Typically, these systems sort the search pool of properties and present properties within a defined range based on a predefined sort selection.

For example, in U.S. Pat. No. 5,754,850 to Jansen, a method and apparatus is provided for a search system based in software running on a personal computer. In the search system, selection features are selected and a search based upon these search features is performed. Items neither satisfying or closely satisfying the search features of the search are eliminated from the search.

Although the above systems identify real estate properties that meet predefined criteria, there is an increasing need for improved searching techniques in markets where there are large populations of available properties for sale. For example, computer systems of the prior art using predefined sort selection criteria can present enormous quantities of properties based on the number of available properties for sale. Real estate salespeople are finding it increasingly difficult to discriminate the total number of available properties for sale retrieved from these systems to effectively serve their customers.

More recently, to address this problem, real estate brokers have begun limiting the population of available properties for sale by focusing their search on a small number of buildings where they can present themselves as a building specialist. Although this approach allows the broker to develop a universe of alternative properties which are more manageable, limiting the dimension of such searches does not effectively serve real estate customers. As such, an improved technique for analyzing a large number of available real estate properties based on multiple criteria is sorely needed.

SUMMARY OF THE INVENTION

Thus, the present invention is an improved system and method for analyzing multiple real estate properties. The system includes a pool of properties that are searched based on user-defined search criteria. The system identifies comparison properties from the search pool. The comparison properties include attributes that match or are a near match to the search criteria. The system compares each of the comparison properties to at least one average value and demonstrably depicts the comparison to the user.

Various aspects of the system relate to identifying, comparing, and displaying real estate properties.

For example, according to one aspect, a method of analyzing real estate property includes determining a plurality of search features associated with each property found in a search pool of properties, each of the search features having an attribute value associated therewith, and identifying comparison properties from the search pool using at least one of the search features. The method also includes determining at least one average attribute value associated with the search features for the comparison properties, comparing each of the attribute value for each comparison property with an average attribute value, and demonstrably depicting the comparison.

In one preferred embodiment, the method includes searching the pool and selecting comparison properties using an initial filtering criteria based on at least one of the plurality of search features. Preferably, determining the initial filtering criteria includes determining a price range of purchase price. The method can also include determining an upper price value using a seller price, and determining a lower price value using a purchase price.

The method includes comparing at least one attribute of the properties to at least one of the plurality of search features. The method can also include summing the attribute value of each comparison property, and dividing each of the sums by the total number of comparison properties.

For example, the search features can be selected from the group consisting of property type, purchase price, location, building type, light, space and cost. The method can also include displaying the comparison in a grid or table, as well as evaluating the comparison properties using the comparison.

A system, as well as articles which include a machine-readable medium storing machine-readable instructions for implementing the various techniques, are disclosed. Details of various implementations are discussed in greater detail below.

As a result of the invention, a real estate salesperson can define several search criteria that more accurately reflect what buyers have identified as purchasing criteria.

Further benefits include an ability to filter a population of alternative properties from a large potential universe of properties based on the user-configurable search criteria. Another benefit is a method for identifying comparative properties. For example, by averaging characteristics of a population of properties and then portraying each individual property against the averages, a salesperson can effectively work with a very large population of alternative properties and show a customer how a specific property is superior to alternatives.

Other objects and features of the present invention will become apparent from the following detailed description considered in conjunction with the accompanying drawings. It is to be understood, however, that the drawings are designed as an illustration only and not as a definition of the limits of the invention.

BRIEF DESCRIPTION OF THE DRAWINGS

FIG. 5 illustrates an example of calculated averages associated with search criteria.

FIG. 6 illustrates an example of comparison properties displayed pictorially.

DETAIL DESCRIPTION OF THE PREFERRED EMBODIMENTS

Figure 1:
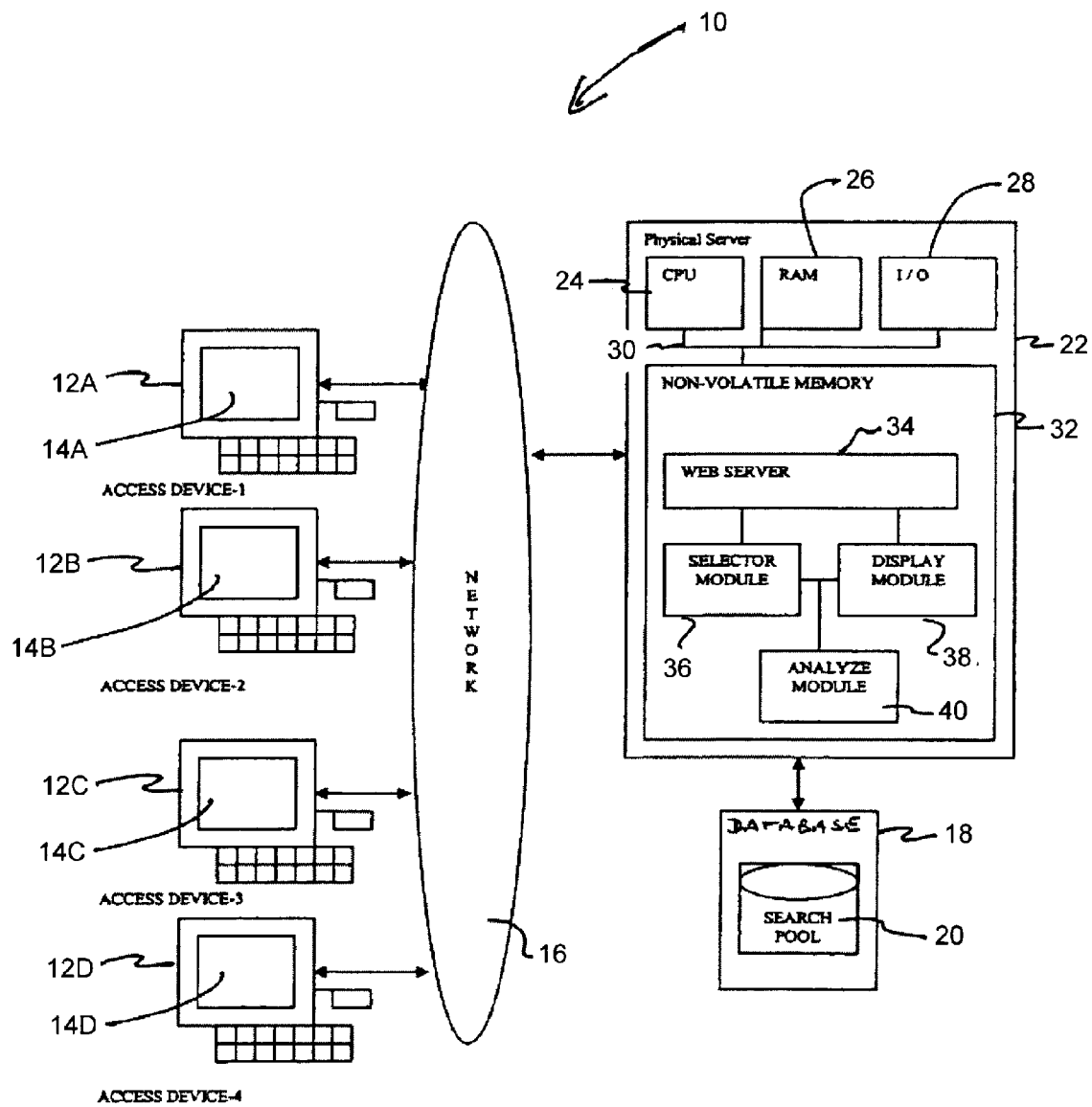
FIG. 1 illustrates a block diagram of a networked computer system for analyzing real estate properties according to the present invention.

Referring to FIG. 1, in one preferred embodiment, a computer-based system 10 that analyzes real estate properties is disclosed. The system 10 includes a server 22 that analyzes real estate property information in response to requests from access devices 12A-D. As shown in FIG. 1, a user using an access device 12A-D over a network 16 can access the server 22 to request and receive the analyzed real estate property information.

In the embodiment shown in FIG. 1, each access device 12A-D is configured with a web browser 14A-D capable of requesting and displaying the real estate property information. The access devices 12A-D can include a personal computer, a laptop computer, or other electronic-based device to access the server 22. Although only four access devices are illustrated in FIG. 1, the system 10 can be configured to support various numbers of access devices.

Network 16 can include various devices such as servers, routers, and switching elements that can be connected in an extranet, intranet or Internet configuration. In some implementations, the network 16 uses wired communications to transfer information to and from the access devices 12A-D and the server 22. In other implementations, the network 16 uses wireless communication protocols. In yet other implementations, the network 16 uses a combination of wired and wireless communication protocols.

Database 18 provides access to descriptive information relating to one or more real estate properties and is accessible to the server 22. In one preferred embodiment, the database 18 is a relational database that maintains real estate property information in a search pool 20. In another preferred embodiment, the database 18 is a directory server, such as a Lightweight Directory Access Protocol ('LDAP') server, that maintains real estate information in the search pool 20. In other implementations, the database 18 and search pool 20 are a configured area in the non-volatile memory 32 of the server 22 that maintains real estate property information. Of course, it will be appreciated by one skilled in the art that the database 18 can also be accessed over the network 16 and can be used to not only maintain real estate descriptive information but can also be used to store calculated real estate information as described below.

As shown in FIG. 1, the server 22 includes a central processing unit ('CPU') 24, random access memory ('RAM') 26, non-volatile memory 32 and an input-output device 28, all of which are interconnected via a bus line 30 and controlled by the CPU 24. The non-volatile memory 32 is configured to include a web server 34 to communicate with access devices 12A-D, a selector module 36 to determine search features associated with property in the search pool 20, an analyze module 40 to identify comparison properties from the search pool 20 and a display module 38 to display pictorially attributes of the comparison properties.

Web server 34 manages communications between the access devices 12A-D and the server 22. Preferably, the web server 34 is configured to send and receive information in the form of web pages to any of the browsers 14A-D in response to a request. The web server 34 communicates with each web browser 14A-D and software modules 36, 38 and 40 using one or more communication protocols, such as HTTP (Hyper Text Markup Language). In one preferred embodiment, for example, the web server 34 is configured to include the Apache HTTP Server from the Apache Software Foundation. In another preferred embodiment, the web server 34 includes Internet Information Services (IIS) from Microsoft Corporation. In yet another preferred embodiment, the web server 34 includes the Sun Java System Web Server from Sun Microsystems.

Figure 2:
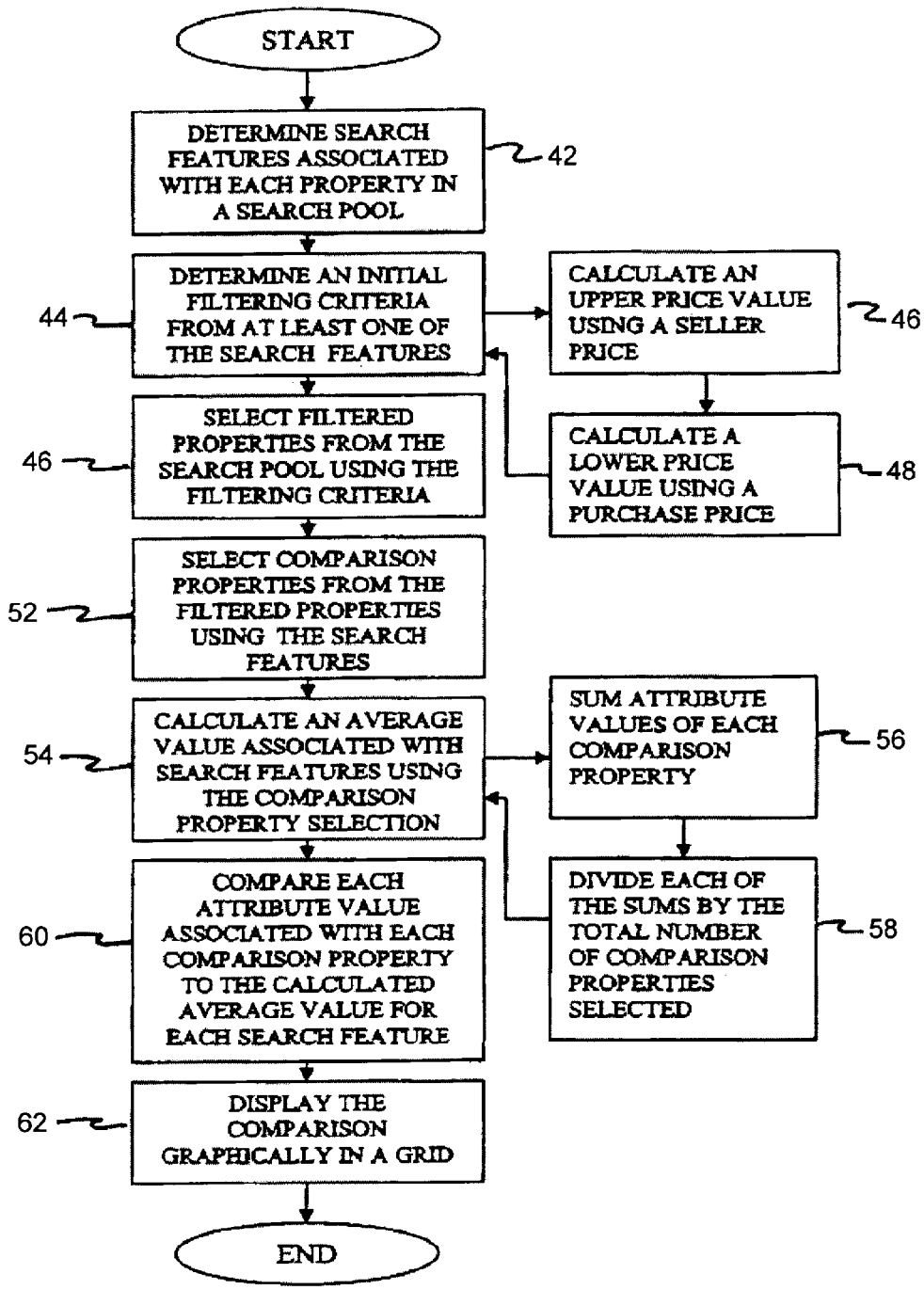
FIG. 2 is a flow chart of a method executed by the system of FIG. 1 to analyze real estate properties according to the present invention.

Referring now to FIG. 2, a flow chart of a method executed by the system of FIG. 1 to analyze real estate properties is disclosed. As shown in FIG. 2, first, the system 10 determines search features associated with each search property in a search pool 42. Next, in one preferred embodiment, the system 10 determines an initial filtering criteria from at least one the search features 44. Preferably, this includes calculating an upper price value using a seller price 46 and calculating a lower price value using a purchase price 48. Next, the system 10 selects filtered properties from the search pool using the filtering criteria 50. The system 10 then selects comparison properties from the filtered properties using the search features 52. Next, the system 10 calculates an average value associated with search features using the comparison property selection 54. In one preferred embodiment, the system 10 sums attribute values of each comparison property 56 and then divides each of the sums by the total number of comparison properties selected 58. Next, the system 10 compares each attribute value associated with each comparison property to the calculated average value for each search feature 60. Finally, the system 10 displays the comparison graphically in a grid or table format 62. Details of the above described steps along with the software modules provided to execute the same are discussed in further detail below.

Referring back to FIG. 1, the selector module 36 of the present invention determines the search features associated with real estate properties in the search pool 20 in response to a request received from the one of the browsers 14A-D via the web server 34. For example, in one preferred embodiment, the selector module 36 queries one or more table definitions of the search pool 20 to determine available search features. Once the search features are retrieved, the selector module 36 provides the search features to the access devices via the web server 34 as user selectable search criteria. For example, in response to a user request from one of the access devices 12A-D, the selector module 36 provides the following user selectable search features: property type e.g., single family, condominium, cooperative, business property, etc., seller's asking price, preferred location, building type, light, space, and cost.

Preferably, the selector module 36 displays the property type and location search features of properties on a user selectable scale each having attribute values ranging from 1 to 10. Similarly, the selector module 36 displays a lighting availability search feature for properties. For example, in one preferred embodiment, the selector module 36 provides a user selectable scale having attribute values ranging from 1 to 10 representing relative floor locations (e.g., $1^{st}$ floor, $5^{th}$ floor, $10^{th}$ floor, etc.) and grade for a predominant view available in any one particular room of a property.

The selector module 36 allows the user to quantify qualitative preferences regarding "value rooms". For example, in the context of an apartment search, the selector module 36 provides the user with space size choices for a living room, dining room and master bedroom. The selector module 36 then quantifies the space in these rooms by calculating an accumulated figure representing dimensions of the space in the apartment. Preferably, the selector module 36 also allows the user to select monthly carrying costs that include maintenance costs for a cooperative and a combination of common charges and real estate taxes for condominiums.

In some preferred embodiments, the selector module 36 allows the user to identify different ownership interests in real estate property. For example, in one preferred embodiment, the selector module 36 provides a configurable standard form of ownership consisting of a 25% equity interest and a 75% financing option and portrays the relative down payment of each property and associated monthly carrying costs including debt service.

In another preferred embodiment, the selector module 36 provides an air search feature representing the openness of a real estate property. The selector module 36 determines values for the air search feature by considering ceiling heights and property layout. Preferably, the selector module 36 does not discriminate properties based on the air search feature but provides the same as a reference for the user during final real estate property selection.

As discussed in connection with FIG. 2, the selector module 36 can determine an initial filtering criteria from one or more of the determined search features and select properties from the search pool 20 using the filtering criteria. The initial filtering criteria can be a price range that is derived from a user purchase price.

Figure 3:
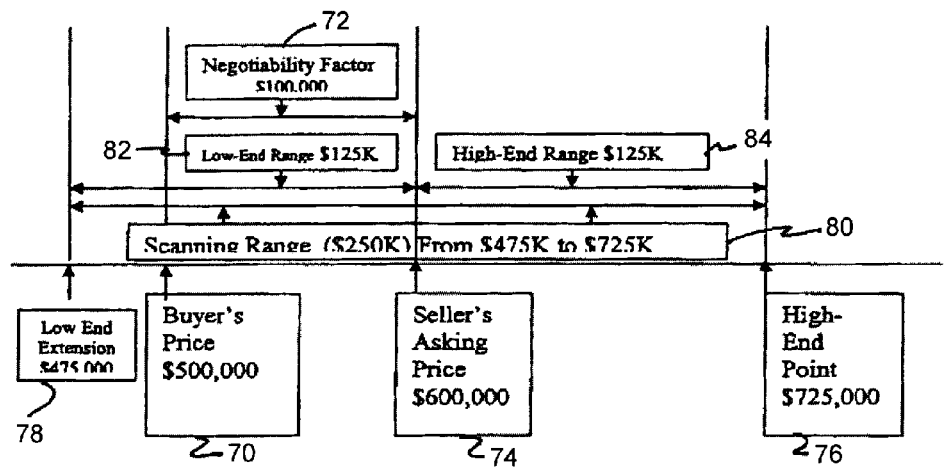
FIG. 3 illustrates an example of establishing initial filtering criteria according to the present invention.

For example, referring now to FIG. 3, the selector module 36 can first determine an initial purchasing price 70 that is input by the user and then vary that amount above the requested purchase price to model the fact that most purchasers and sellers of property are willing to negotiate. The selector module 36 can vary the amount of negotiability 72 given supply/demand factors at any given time based on user input. Next, the selector module 36 identifies a price point where there is a likelihood that a seller in the market can negotiate a deal with a purchaser given current market conditions. Preferably, the current market conditions are input by the user. The selector module 36 then determines a range of prices between the purchaser's requested price 70 and the calculated price point which represents a seller's price 74. Preferably, the seller price 74 is calculated by adding the amount of negotiability 72 to the purchaser's requested price 70. Next, the selector module 36 determines a price point below the purchaser's requested price 70, hereinafter referred to as a "low-end extension" value 78 which represents unique opportunities that can exist in the marketplace below the purchaser's requested price 70. Next the selector module 36 identifies the dollar amount represented by the value of the low-end extension 78 and the seller's asking price 74. By doubling this sum, the seller's asking price becomes an average point or benchmark that the analyze module 40 can compare each property to. Next, as shown in FIG. 3, the selector module 36 determines a low-end range 82 representing values below the average point less the amount of negotiability 72 and a high-end range 84 representing values above the average point plus the amount of negotiability 72. Lastly, the selector module 36 combines the two ranges 82, 84 to form an initial filtering criteria 80 and selects properties from the search pool 20 using the same.

The analyze module 40 of the present invention identifies comparison properties from the search pool 20 using one or more user selectable search features, determines one or more average attribute values associated with the comparison properties and compares each of the attribute values for each comparison property with one or more of the calculated average attribute values. In one preferred embodiment, the analyze module 40 rounds the calculated average attribute values to the nearest whole number. Of course, it will be appreciated by one skilled in the art that other rounding techniques can be utilized by the analyze module 40.

Preferably, the analyze module 40 is initiated in response to a request received from one of the browsers 14A-D via the web server 34. The analyze module 40 may then select comparison properties from the search pool using one or more of the user selectable search features. Although initial filtering can decrease the number of available properties for comparison, as discussed in connection with the selector module 36, the number of properties to be compared can still be large to evaluate efficiently. Advantageously, the analyze module 40 allows the user to further refine and filter properties based on any number of search features to obtain a population of comparison properties that the user deems appropriate under the circumstances.

Figure 4:
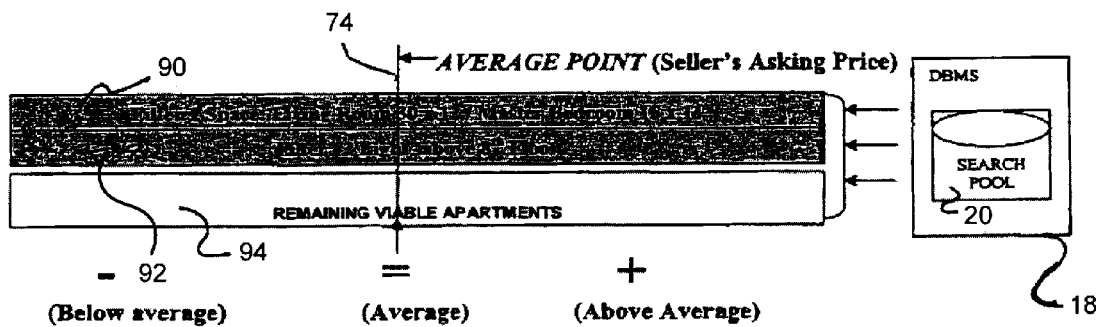
FIG. 4 illustrates an example of filtering properties from a search pool.

For example, referring now to FIG. 4, an example of filtration provided by the analyze module 40 is shown. In the FIG. 4 example, comparison apartments are being filtered. The example assumes that a large number of properties are already identified from the search pool 20 using a pricing range of $475,000 to $725,000.

As shown in the FIG. 4 example, the space search feature is first employed as a main determinant for a user purchasing property. The analyze module 40 filters the selected properties 90 by requiring that the attribute value associated with the space feature of each property include dimensions substantially equivalent to 30×12 for a living room and 16×11 for a master bedroom. Once the analyze module 40 completes the filtration, the number of selected properties having those attribute values are reported to the user via the web server 34. If the number of selected properties remains too large, the user can request the analyze module 40 to apply additional filters as necessary to obtain a manageable number of comparison properties. For example, as shown in FIG. 4, a second filter representing light is selected by the user. The analyzer module 40 then filters the comparison apartments to eliminate all apartments below the $8^{th}$ floor 92 resulting in a remaining number of properties for comparison 94.

As discussed in connection with FIG. 2, the analyzer module 40 can average the remaining population of comparison properties based on the search features. For example, referring now to FIG. 5, a sample of comparison properties 120 each having associated therewith an attribute value associated with a search feature is shown. Preferably, as shown in FIG. 5, the search features include an address feature 96, location-grade feature 98, building-grade feature 100, light feature 106 having both a floor indicator 102 and view grade 104, a space feature 114 having a living room 108 and master bedroom feature 112, a calculated total space feature 112, asking price 116 and cost feature 118.

The analyze module 40 sums each attribute value of each comparison property 122 and divides each of the sums 122 by a total number of comparison properties to calculate average attribute values 124. As mentioned previously and as shown in FIG. 5, the analyze module 40 also can include rounding techniques during calculation of average attribute values.

Once the analyze module 40 calculates the average attribute values 124, the analyze module compares each comparison property attribute value to a respective calculated average attribute value and initiates the display module 38 to display the same.

The display module 38 of the present invention demonstrably depicts the comparison of selected property attributes to the calculated search feature averages generated by the analyze module 40 and sends the same to the web server 34 for display on one or more browsers 14A-D.

For example, in one preferred embodiment, referring now to FIG. 6, the display module 38 displays the comparison properties 120 in a table-like form, such as a table or grid 121.

Of course, it will be appreciated by one skilled in the art that other techniques for displaying the comparison properties can be employed by the display module 38 and are within the scope of the present invention and claims. For example, in one preferred embodiment, the display module 38 depicts comparison properties using a bar chart. In another preferred embodiment, pie charts are used by the display module 38 to depict comparison properties.

Preferably, the display module 38 demonstrably depicts the comparison of property attribute values to the calculated average attribute values using symbols that indicate whether a particular property attribute value is above, below, or substantially equal to the calculated average attribute values. For example, as shown in FIG. 6, the display module 38 uses symbols, such as '+', '−', and '=', to demonstrably depict the property attribute comparisons.

For example, turning now to FIGS. 5 and 6, for one comparison property 120E, the display module 38 displays a '+' symbol 132 for the attribute value associated with the grade feature. As shown in the FIG. 5 example, the calculated attribute average for the grade search feature is (7) and the attribute value associated with property 120E for the grade feature is (9) indicating that property 120E's attribute value for grade is above the average. Similarly, the display module 38 displays a '=' symbol 134 for the attribute value associated with the space search feature to indicate that the calculated search feature average of (598) is substantially the same as the attribute value associated with property 120E for space (595). Likewise, the display module 38 displays a '−' symbol 136 for the attribute value associated with the price search feature as the price for property 120E (700K) exceeds the calculated price average (597K) and is therefore less desirable.

Of course, it will be appreciated by one skilled in the art that other symbols, graphics and animations can be used to show the attribute value comparisons. For example, in one preferred embodiment, upward and downward directed arrows and dash lines are shown by the display module 38 to pictorially display whether a particular property attribute value is above, below, or substantially equal to calculated search feature averages, respectively.

Advantageously, displaying the comparison property attribute values pictorially allows a user of the system to develop a clearer portrayal of comparison properties and allows a user of the system discriminate between available properties efficiently.

A number of embodiments of the invention have been described. Nevertheless, it will be understood that various modifications can be made without departing from the spirit and scope of the invention. For example, the modules described above can be organized or contained in various ways, and can reside on multiple computers or a single computer. Also, the steps described above can be modified in various ways or performed in a different order than described above, where appropriate. Accordingly, other embodiments are within the scope of the following claims.

What is claimed is:

1. A method of analyzing real estate property, the method comprising:
   determining a plurality of search features associated with each property found in a search pool of properties, each of said search features having an attribute value associated therewith;
   identifying comparison properties from said search pool using at least one of said search features;
   determining an average attribute value associated with a search feature for said comparison properties;
   comparing an attribute value of said search feature for each comparison property to said average attribute value; and
   depicting demonstrably said comparison of said attribute value for each comparison property to said average attribute value with a symbol that indicates whether said attribute value for each comparison property is one of above, below and substantially equal to said average attribute value.

2. The method of claim 1, wherein identifying said comparison properties comprises searching said pool and selecting properties using an initial filtering criteria based on at least one of said plurality of search features.

3. The method of claim 2, wherein using said initial filtering criteria comprises determining a price range of purchase price.

4. The method of claim 3, wherein determining said price range comprises:
   determining an upper price value using a seller price; and
   determining a lower price value using a purchase price.

5. The method of claim 1, wherein searching for comparison properties comprises comparing at least one attribute of said properties to at least one of said plurality of search features.

6. The method of claim 1, wherein determining said average attribute value comprises:
   summing said attribute value of each comparison property into a sum; and
   dividing said sum by a total number of comparison properties.

7. The method of claim 6, comprising rounding said average attribute value.

8. The method of claim 1, wherein said plurality of search features are selected from the group consisting of property type, purchase price, location, building type, light, space and cost.

9. The method of claim 1, further comprising displaying said comparison in a grid.

10. The method of claim 1, further comprising displaying said comparison in at least one of a bar chart and pie chart.

11. The method of claim 1, wherein depicting demonstrably said comparison comprises displaying the symbol selected from the group consisting essentially of '+', '−' and '=' based on said comparison.

12. The method of claim 1, further comprising evaluating said comparison properties using said comparison.

13. A system to analyze real estate property, the system comprising:
   a search pool coupled to a network, the search pool storing real estate property information;
   a service delivery device coupled to the network, the service delivery device including a processor and memory storing instructions that, in response to receiving a request for access to a service, cause the processor to:
   determine a plurality of search features associated with each property found in said search pool of properties, each of said search features having an attribute value associated therewith;
   identify comparison properties from said search pool using at least one of said search features;
   determine an average attribute value associated with a search feature for said comparison properties;
   compare an attribute value of said search feature for each comparison property to said average attribute value; and
   depict demonstrably said comparison of said attribute value for each comparison property to said average attribute value with a symbol that indicates whether said attribute value for each comparison property is one of above, below and substantially equal to said average attribute value.

14. The system of claim 13, wherein the memory stores instructions that, in response to receiving the request, cause the processor to search said pool and select properties using an initial filtering criteria based on at least one of said plurality of search features.

15. The system of claim 14, wherein the memory stores instructions that, in response to receiving the request, cause the processor to determine a price range of purchase price.

16. The system of claim 15, wherein the memory stores instructions that, in response to receiving the request, cause the processor to:
determine an upper price value using a seller price; and
determine a lower price value using a purchase price.

17. The system of claim 13, wherein the memory stores instructions that, in response to receiving the request, cause the processor to compare at least one attribute of said properties to at least one of said plurality of search features.

18. The system of claim 13, wherein the memory stores instructions that, in response to receiving the request, cause the processor to:
sum said attribute value of each comparison property into a sum; and
divide said sum by a total number of comparison properties to determine said average attribute value.

19. The system of claim 18, wherein the memory stores instructions that, in response to receiving the request, cause the processor to round said average attribute value.

20. The system of claim 13, wherein the memory stores instructions that, in response to receiving the request, cause the processor to select from the group consisting of property type, purchase price, location, building type, light, space and cost.

21. The system of claim 13, wherein the memory stores instructions that, in response to receiving the request, cause the processor to display said comparison in a grid.

22. The system of claim 13, wherein the memory stores instructions that, in response to receiving the request, cause the processor to display said comparison in at least one of a bar chart and pie chart.

23. The system of claim 13, wherein the memory stores instructions that, in response to receiving the request, cause the processor to display the symbol selected from the group consisting essentially of '+', '−' and '=' based on said comparison.

24. An article comprising a machine-readable medium storing machine-readable instructions that, when applied to the machine, cause the machine to:
determine a plurality of search features associated with each property found in said search pool of properties, each of said search features having an attribute value associated therewith;
identify comparison properties from said search pool using at least one of said search features;
determine an average attribute value associated with a search feature for said comparison properties;
compare an attribute value of said search feature for each comparison property to said average attribute value; and
depict demonstrably said comparison of said attribute value for each comparison property to said average attribute value with a symbol that indicates whether said attribute value for each comparison property is one of above, below and substantially equal to said average attribute value.

25. The article of claim 24 including instructions that, when applied to the machine, cause the machine to search said pool and select properties using an initial filtering criteria based on at least one of said plurality of search features.

26. The article of claim 25 including instructions that, when applied to the machine, cause the machine to determine a price range of purchase price.

27. The article of claim 26 including instructions that, when applied to the machine, cause the machine to:
determine an upper price value using a seller price; and
determine a lower price value using a purchase price.

28. The article of claim 24 including instructions that, when applied to the machine, cause the machine to compare at least one attribute of said properties to at least one of said plurality of search features.

29. The article of claim 24 including instructions that, when applied to the machine, cause the machine to:
sum said attribute value of each comparison property into a sum; and
divide said sum by a total number of comparison properties to determine said average attribute value.

30. The article of claim 29 including instructions that, when applied to the machine, cause the machine to round said average attribute value.

31. The article of claim 24 including instructions that, when applied to the machine, cause the machine to select from the group consisting of property type, purchase price, location, building type, light, space and cost.

32. The article of claim 24 including instructions that, when applied to the machine, cause the machine to display said comparison in a grid.

33. The article of claim 24 including instructions that, when applied to the machine, cause the machine to display said comparison in at least one of a bar chart and pie chart.

34. The article of claim 24 including instructions that, when applied to the machine, cause the machine to display the symbol selected from the group consisting essentially of '+', '−' and '=' based on said comparison.

* * * * *